United States Patent [19]

Van Deventer et al.

[11] 4,011,396
[45] Mar. 8, 1977

[54] GAS-FILLED HIGH-VOLTAGE CABLE BUILT UP OF RIGID SEGMENTS

[75] Inventors: Gijsbrecht Coenraad Van Deventer, Delft; Gerard Adriaan Visser, Beemster, both of Netherlands

[73] Assignee: N.K.F. Kabel B.V., Delft, Netherlands

[22] Filed: Dec. 6, 1974

[21] Appl. No.: 530,282

[30] Foreign Application Priority Data

Dec. 12, 1973 Netherlands ............ 7316991

[52] U.S. Cl. ............ 174/11 R; 174/16 B; 174/21 C; 174/22 C
[51] Int. Cl.² ............ H02G 5/06
[58] Field of Search ............ 174/11 R, 21 R, 21 C, 174/21 CA, 22 R, 22 C, 10, 16 B, 28

[56] References Cited
UNITED STATES PATENTS

| 2,079,856 | 5/1937 | Hochstadter et al. | 174/11 R |
| 3,331,911 | 7/1967 | Whitehead | 174/22 R |
| 3,558,798 | 1/1971 | Albright | 174/11 R X |
| 3,652,777 | 3/1972 | Elliott | 174/11 R |
| 3,814,830 | 6/1974 | Cronin | 174/16 B X |
| 3,819,846 | 6/1974 | Jakobsen | 174/11 R |

Primary Examiner—Arthur T. Grimley
Attorney, Agent, or Firm—Frank R. Trifari

[57] ABSTRACT

A high voltage cable filled with an insulation gas under an operating pressure of more than 1 Bar, in which one or more conductors are supported by insulators, embedded in a tubular sheath of interconnected rigid elements and in which the gas-filled spaces of adjacent segments are connected together through a sealing element which is open under operating conditions and is closed when the pressures in the adjacent segments differ by more than a predetermined pressure difference.

1 Claim, 3 Drawing Figures

GAS-FILLED HIGH-VOLTAGE CABLE BUILT UP OF RIGID SEGMENTS

The invention relates to a high-voltage cable filled with an insulation gas under an operating pressure of more than 1 Bar in which one or more conductors are supported by insulators within a tubular housing, said cable being built up of interconnected rigid segments. In such a cable the insulation gas generally consists of sulphur hexafluoride or a mixture of sulphur hexafluoride and air or nitrogen comprising up to 30% by volume of air or nitrogen.

Generally a number of rigid segments of a certain length are assembled to form a high-voltage cable. Such a cable may be divided in a number of sections by means of gastight interconnections to permit flow of gas and supervision of the high-voltage cable. High-voltage cables of the type to which the invention relates may alternatively be built up of gastight segments which have already been filled with insulation gas up to the desired operating pressure during manufacture. A cable built up of such gas-containing segments has the advantage that in case of leakage of the cable, for example, as caused by mechanical violence generally only one segment will empty so that relatively little gas will be lost. Replacement of such a segment will not yield great difficulties.

A drawback of the first construction is that an inspection under operating conditions of each individual segment preceding assembly is rather cumbersome.

A drawback of both constructions is that regular inspection of the gas for impurities such as decomposition products of the gas, dust particles, water and a removal of these impurities as well as a compensation of small gas losses requires intricate constructions.

An object of the invention is to obviate these drawbacks. This object is satisfied by a high-voltage cable which according to the invention is characterized in that the gas-filled spaces of adjacent segments are connected through a blocking-device which is open under operating conditions but closes when the pressures in the adjacent segments differ by more than a predetermined pressure difference.

In a high-voltage cable according to the invention a flow of the gas through the entire cable is possible through the segments and the blocking devices which are open under normal operating conditions. The outflowing gas can be purified and led back through the usually hollow conductor into the gas-filled space in the high-voltage cable in accordance with an embodiment to be described hereinafter. In this connection operating conditions are understood to mean those conditions in which the pressures of the insulation gas in adjacent segments differ by less than a certain value or are substantially equal. Under these circumstances it is possible to cause the insulation gas to flow at a certain rate through the high-voltage cable and to compensate for small gas losses. However, when breakage occurs in the housing of one of the segments so that the pressure in the relevant segment quickly decreases, the blocking device prevents the flowing of insulation gas from adjacent segments to the damaged segment.

After repair or replacement of the damaged segment the blocking devices open when the operating pressure in the repaired or replaced segment is reached so that the connection between the gas spaces of the relevant segments is re-established.

According to a preferred embodiment of the high-voltage cable is built up of a number of segments filled with insulation gas already before the assembly, up to a pressure which is at least sufficient to keep the blocking devices closed and which is at most equal to the operating pressure.

These segments may be inspected electrically in the factory under operating pressure before assembly. Subsequently the segments may be brought to a lower pressure, if desired, which is sufficient to keep the blocking devices closed. Time-consuming evacuation and subsequent filling with insulation gas of larger high-voltage cable lengths after assembly is avoided when using this preferred embodiment.

The blocking devices may have valves which are directly operated pneumatically and/or electrically or by a difference in pressure of the insulation gas on both sides of the blocking devices.

For the previously mentioned possibilities the pressures in adjacent segments are measured and when finding a pressure difference which is larger than is admitted the valve in the blocking device is closed through pneumatic and/or electrical means.

The use of a blocking device in which a valve is directly operated by the flow of the insulation gas upon exceeding a certain pressure difference between adjacent segments is, however, preferred. Such a blocking device may be of a simple construction and there is little or no chance of disturbance as may occur in a blocking device which is operated by means of a signal from a measuring device.

A blocking device which is preferably used in the high-voltage cable includes in its simplest form a valve which is maintained open by a spring having such a tension that upon exceeding a certain difference of the pressures of the gas on both sides of the blocking device the valve is closed.

There are several possibilities for placing blocking devices in the high-voltage cable. The blocking devices may be placed, for example, in the hollow conductor. Furthermore in segments whose ends are closed by a wall the blocking device may placed in the wall. Another possibility is to place the blocking devices in tubes connecting the gas spaces in successive closed segments and parts of the cable connecting such segments.

For circulating the insulation gas a hollow conductor may serve as a return tube in some of the above-mentioned possibilities. It is also possible to mount a separate tube for this purpose parallel to the high-voltage cable.

The invention will now be described in greater detail with reference to the accompanying drawing.

Figure 1:
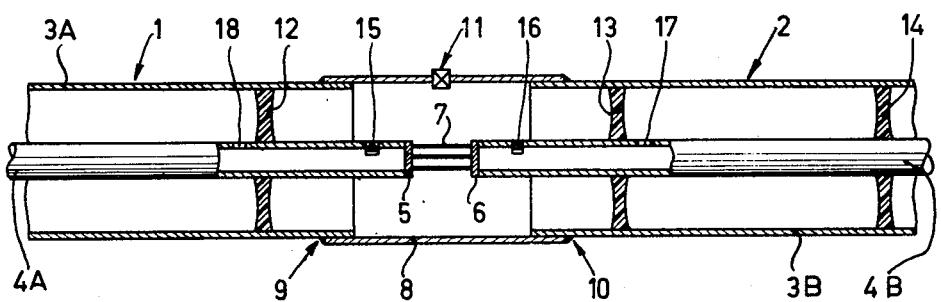
FIG. 1 shows a cross-section of part of a high-voltage cable according to the invention.

An embodiment of a high-voltage cable according to the invention is built up of a number of rigid segments of which parts 1 and 2 are shown in FIG. 1. The segments consist of metal outer tubes 3A and 3B (for example, of an aluminum alloy) and hollow metal conductors 4A and 4B (for example, of aluminium). The hollow conductors 4A and 4B are closed at 5 and 6 and interconnected through a number of metal conductors 7. The outer tubes 3A and 3B are connected to each other through the tubular metal connection part 8, for example, by welding connection part 8 circumferentially at 9 and 10 on the metal outer tubes 3A and 3B. The connection part 8 is provided with a locking device 11 through which the connection part can be evacuated and filled with insulation gas. The hollow conductors 4A and 4B are supported within the outer tubes 3A and 3B by insulators of non-conducting synthetic resin material three of which are shown in FIG. 1 (12, 13 and 14). The hollow conductors accommodate blocking devices at 15 and 16 (diagrammatically shown) and apertures 17 and 18.

Figure 2:
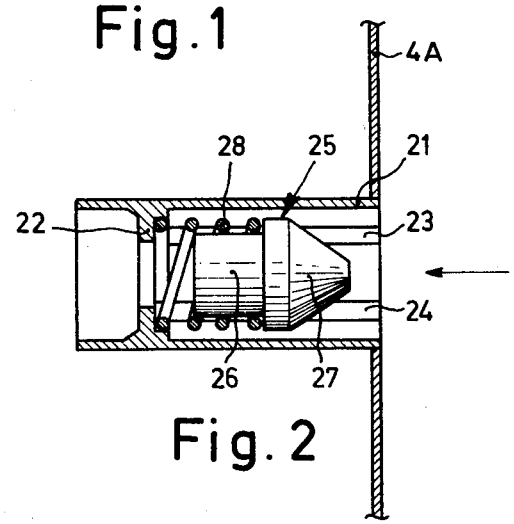
FIG. 2 shows a cross-section of a blocking device which can be used in a high-voltage cable according to the invention.

FIG. 2 diagrammatically shows the structure of a blocking device provided in the wall of the hollow metal conductor 4A part of which has been shown. The blocking device in principle comprises a metal tubular part 21 provided on its inner side with a circumferential seat edge 22 and surrounded by a number of axially arranged ridges two of which (23 and 24) are shown in FIG. 2. The ridges serve for centering and axially guiding the sealing member 25 consisting of a stem 26 cooperating with the seat edge 22 upon shutting off the gas stream through the device and a head 27. The transition edge from stem 26 to head 27 serves as an abutment for the spring 28 the other end of which engages the seat edge 22. The operation of the blocking device shown in FIG. 2 is as follows: when the pressures in adjacent gas spaces of the cable which are in connection with each other through the blocking device differ by more than a predetermined pressure difference and this in such a manner that the pressure to the left of the blocking device shown in FIG. 2 is lower than that to the right thereof, the sealing member is driven to the left. The end face of the stem 26 remote from the head 27 is then pressed against the seat edge 22 so that the gas stream is shut off by the sealing element. The value of the pressure difference at which the sealing element shuts off the gas stream is dependent on the spring 28. The spring tension is chosen to be such that a constant slight gas stream sufficient for purification purposes and replenishment of gas losses is possible.

Figure 3:
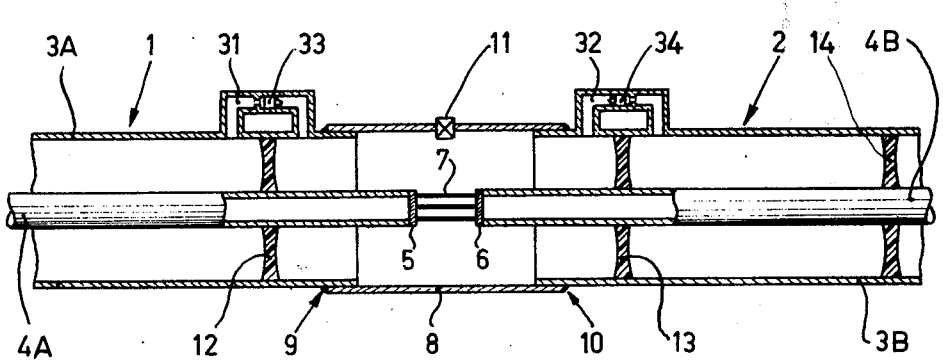
FIG. 3 shows a cross-section of part of a further embodiment of a high-voltage cable according to the invention.

FIG. 3 shows part of a further embodiment of a high-voltage cable according to the invention. The references in this Figure corresponding to those in FIG. 1 have the same significance. The segments are sealed at their ends by the supporting members 12 and 13. In the embodiment shown in FIG. 3 the gas spaces are in connection with each other in the segments 1 and 2 shown through the connection tubes 31 and 32. The connection tubes 31 and 32 accommodate blocking devices 33 and 34 (shown diagrammatically), for example, of the type as shown in FIG. 2. The high-voltage cable according to the invention is built up as follows. The cable consists of segments which have preferably been filled in the factory with the insulation gas such as $SF_6$, for example, up to a pressure of 4 Bar. In these segments the end insulators serve as a gastight sealing wall. The blocking devices are provided in such a manner that due to the difference in pressure from the surrounding atmosphere the elements are maintained closed. At the area where the cable must be mounted segments are connected together electrically and in a gastight manner with the aid of a tubular metal connection part (8) circumferentially welded at the edges (9 and 10) on the metal outer tubes (3A and 3B) of the segments (1 and 2) and through a number of metal conductors (7) with which the hollow conductors (4A and 4B) are connected together. The connection part is subsequently evacuated and filled with insulation gas upon which the block devices open. The connection part may also have the function of an expansion compensating part. The blocking devices (15 and 16 FIG. 1; 33 and 34 FIG. 2) are accommodated in such a manner that in case of a decrease of the gas pressure in one of the segments (1, 2) causing the pressure difference to exceed a value determined by the spring tension in the blocking device the gas supply to that segment is shut off through the blocking devices which are provided on both ends of the segment. If also the spaces in the hollow conductors are connected to each other through connection tubes, the hollow conductors in this embodiment may serve as a return tube for the insulation gas. It is evident that according to the invention a high-voltage cable is obtained in which a constant gas stream can be maintained so that a continuous purification and possible replenishment of low gas losses due to small leakages of the insulation gas is possible. In case of occurrence of large leakages only a slight part of the insulation gas can be lost.

Another advantage is that the segments can already be brought to the operating pressure in the factory and tested.

What is claimed is:

1. A high voltage cable filled with an insulation gas under an operating pressure of more than 1 Bar, comprising a plurality of segments and means for rigidly interconnecting said segments, each segment comprising one or more conductors supported by insulators within a tubular housing, an insulating gas under pressure within said housing, and a blocking device comprising a valve arranged to prevent escape of gas prior to assembly of said segments into a cable, and when pressure in the segment exceeds that in an adjacent segment by more than a predetermined amount; said valve comprising means for biasing the valve toward an open condition such that the valve opens when pressure on each side of the valve is equal, and a stem arranged to reclose when pressure in the segment exceeds that in an adjacent segment by more than a predetermined amount.

* * * * *